United States Patent
Kato et al.

(10) Patent No.: US 10,647,268 B2
(45) Date of Patent: May 12, 2020

(54) FLOOR STRUCTURE OF LUGGAGE COMPARTMENT OF VEHICLE

(71) Applicant: TOYOTA BOSHOKU KABUSHIKI KAISHA, Aichi (JP)

(72) Inventors: Yukio Kato, Aichi-ken (JP); Yuki Ito, Aichi-ken (JP); Yoshiki Funahashi, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 27 days.

(21) Appl. No.: 16/211,792

(22) Filed: Dec. 6, 2018

(65) Prior Publication Data

US 2019/0184912 A1 Jun. 20, 2019

(30) Foreign Application Priority Data

Dec. 14, 2017 (JP) ................................. 2017-239360

(51) Int. Cl.
*B60R 13/01* (2006.01)
*B60R 13/04* (2006.01)
*B60R 5/04* (2006.01)

(52) U.S. Cl.
CPC ............ *B60R 13/013* (2013.01); *B60R 5/045* (2013.01)

(58) Field of Classification Search
CPC ......... B60R 5/04; B60R 5/045; B60R 13/011; B60R 13/013
USPC ........................................... 160/84.01, 84.06
See application file for complete search history.

(56) References Cited

U.S. PATENT DOCUMENTS

| 4,256,340 | A | * | 3/1981 | Dunchock | ................. | B60R 7/04 |
| | | | | | | 296/37.15 |
| 4,351,555 | A | * | 9/1982 | Hashimoto | ............ | B60R 5/044 |
| | | | | | | 16/366 |
| 8,172,295 | B2 | * | 5/2012 | Fischer | ................... | B60R 5/045 |
| | | | | | | 296/24.43 |
| 9,827,914 | B2 | * | 11/2017 | Murray | ................... | B62D 25/20 |
| 2015/0054299 | A1 | * | 2/2015 | Yoshizawa | ............. | B60R 5/045 |
| | | | | | | 296/37.16 |
| 2015/0145273 | A1 | * | 5/2015 | Gaas | ........................ | B60R 5/04 |
| | | | | | | 296/37.16 |

FOREIGN PATENT DOCUMENTS

| EP | 2578453 | A1 | * | 4/2013 | ............... | B60R 7/02 |
| JP | 4625832 | | | 2/2011 | | |

* cited by examiner

*Primary Examiner* — Dennis H Pedder
(74) *Attorney, Agent, or Firm* — Greenblum & Bernstein, P.L.C.

(57) ABSTRACT

A floor structure of a luggage compartment of a vehicle includes a first floor covering including a first support surface, a second floor covering, and a separator including a second support surface. The second floor covering is disposed above the first support surface. The second floor covering includes a first board, a second board, and a hinge. A dimension of the second board in the front-rear direction of the vehicle is greater than that of the first board in that direction. The hinge connects a first end of the second board to a first end of the first board. The second support surface is located below and closer to a front of the vehicle than the first support surface to support a second end of the second board and to restrict the second end from sliding toward the front when the second floor covering is in a folded position.

9 Claims, 6 Drawing Sheets

FLOOR STRUCTURE OF LUGGAGE COMPARTMENT OF VEHICLE

CROSS REFERENCE TO RELATED APPLICATION

This application claims priority from Japanese Patent Application No. 2017-239360 filed on Dec. 14, 2017. The entire contents of the priority application are incorporated herein by reference.

TECHNICAL FIELD

The technology described herein relates to a floor structure of a luggage compartment of a vehicle.

BACKGROUND

A known luggage compartment floor covering includes a first board, a second board, a third board, a fourth board, and hinges that connect the second board to the first board, the third board to the second board, and the fourth board to the first board. The fourth board is disposed at an angle relative to the first board. The first board can be held by the fourth board and thus additional parts for holding the first board area not required. Furthermore, the luggage compartment floor covering can be folded so that a crease at the top. According to the configuration, the luggage compartment floor covering in a folded position sits still.

To stably maintain the luggage compartment floor covering in the folded position, dimensions of the second board and the third board in a front-rear direction of a vehicle need to be equal to each other. If the dimensions area not equal, extra structures or parts are required to hold the luggage compartment floor covering in the folded position. Furthermore, a certain size of space is required to stably maintain the luggage compartment floor covering in the folded position.

SUMMARY

The technology described herein was made in view of the foregoing circumstances. An object is to provide a floor structure of a luggage compartment of a vehicle including a floor covering configured to sit still in a folded position without degrading an appearance of a luggage compartment.

A technology described herein is related to a floor structure of a luggage compartment of the vehicle. The floor structure includes at least one first floor covering, a second floor covering, and a separator. The at least one floor covering projects from a sideboard of the luggage compartment to a luggage space of the luggage compartment and includes at least one first support surface. The second floor covering is disposed inner than and adjacent to the at least one floor covering in the width direction of the vehicle and above the at least one first support surface. The second floor covering includes a first board, a second board, and a hinge. The first board includes a first end and a second end separated from the first end in a front-rear direction of the vehicle. The second board includes a first end adjacent to the first end of the first board and a second end separated from the first end of the second board in the front-rear direction of the vehicle. The second board has a dimension in the front-rear direction of the vehicle greater than a dimension of the first board in the front-rear direction of the vehicle. The hinge connects the first end of the second board to the first end of the first board to shift a position of the second floor covering between an unfolded position in which the second floor covering is flat and a folded position in which the second floor covering is folded on the hinge. The separator separates a underfloor storage located under the second floor covering from a passenger compartment of the vehicle and supports an end of the second floor covering closer to the passenger compartment. The separator includes a second support surface located below and closer to a front of the vehicle than the at least one first support surface to support the second end of the second board of the second floor covering in the folded position from below and to restrict the second end of the second board of the second floor covering in the folded position from sliding toward the front of the vehicle.

Because the second support surface is located below and closer to a front of the vehicle, the second floor coving including the second board with the dimension greater than the dimension of the first board can be stably held in the folded position. According to the configuration, extra parts for holding the second floor covering are not required. Furthermore, in comparison to a configuration in which the second support surface is located closer to the rear of the vehicle than the at least one first support surface, the second floor covering allows easier access to the underfloor storage and thus dead space in the underfloor storage can be reduced. According to the configuration in which the second support surface is located below the at least one first support surface, the position of the second floor covering can be easily shifted regardless of physical sizes of users.

DETAILED DESCRIPTION

First Embodiment

A first embodiment will be described with reference to FIGS. 1 to 5. The right side, the left side, the upper side, and the lower side in FIG. 1 are defined as a rear side, a front side, as an upper side, and a lower side of the vehicle, respectively.

Figure 1:
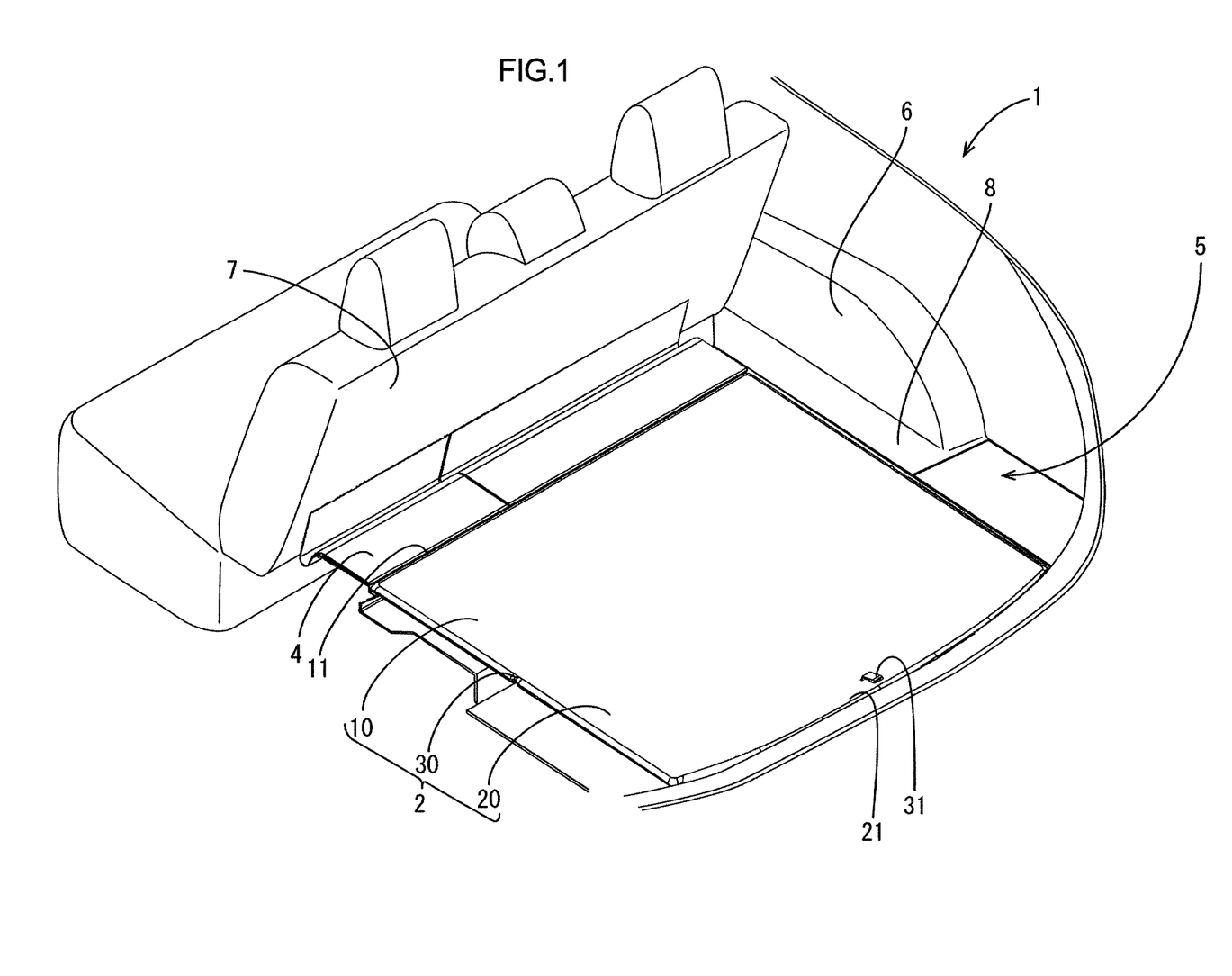
FIG. 1 is a perspective view of a luggage compartment of a vehicle according to a first embodiment.
Figure 2:
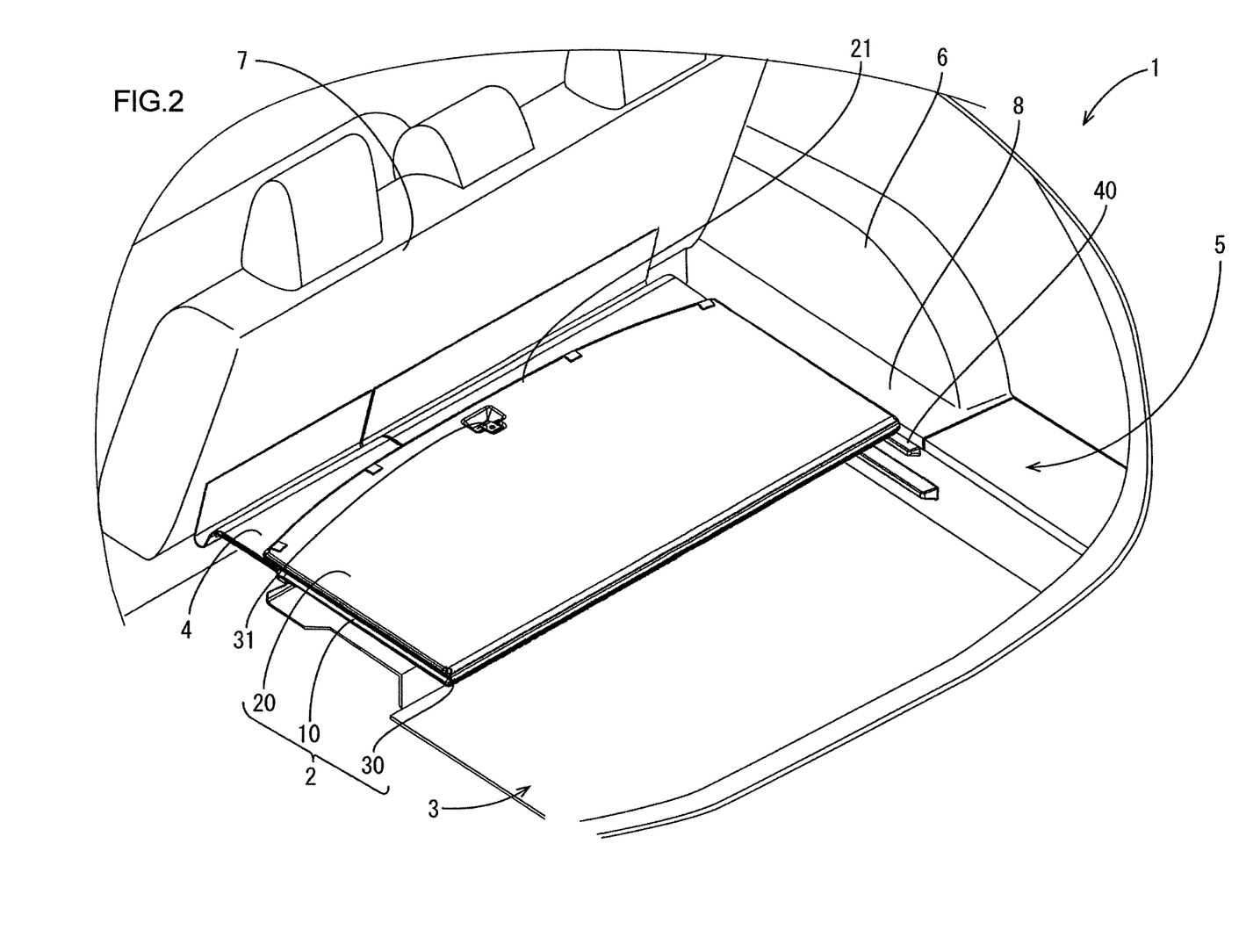
FIG. 2 is a perspective view illustrating a second floor covering including a first board and a second board that is folded over the first board.

As illustrated in FIG. 1, the vehicle includes a luggage compartment 5 at the rear. The luggage compartment 5 includes a luggage space that is defined by right and left sideboards 6, right and left first floor coverings 8, a second floor covering 2, a separator 4, and a back surface of a seat 7. The second floor covering 2, the separator 4, and the right and the left first floor coverings 8 are included in a floor structure 1 of the luggage compartment 5. The sideboards 6 define sidewalls of the luggage compartment 5.

The vehicle further includes an underfloor storage 3 (an underfloor tool box) under the second floor covering 2 and at a position closer to the rear of the vehicle than the separator 4 that separates the underfloor storage 3 from a passenger compartment of the vehicle. The second floor covering 2 is placed flat to cover a portion of the separator and the underfloor storage 3 and to hold luggage thereon. The second floor covering 2 is foldable to access the underfloor storage 3. A position of the second floor covering 2 in which the second floor covering 2 is folded may be referred to as a folded position. A position of the second floor covering 2 in which the second floor covering 2 is flat may be referred to as an unfolded position.

The second floor covering 2 includes a first board 10, a second board 20, and a hinge 30 that is located between the first board 10 and the second board 20. The first board 10 includes a first end closer to the hinge 30 and a second end 11 separated from the first end in the front-rear direction of the vehicle and farther from the hinge 30. The second board 20 includes a first end closer to the first end of the first board 10 and the hinge 30 and a second end 21 separated from the first end of the second board 20 in the front-rear direction of the vehicle and farther from the hinge 30. The hinge 30 connects the first end of the second board 20 to the first end of the first board 10. The second board 20 has a dimension in the front-rear direction of the vehicle than the dimension of the first board 10 in the front-rear direction of the vehicle. The second floor covering 2 is foldable on the hinge 30 to shift a position of the second floor covering 2 between the unfolded positon in which the second floor covering 2 is flat and the folded position. The second floor covering 2 that is in the unfolded position is supported by the right and the left first floor coverings 8.

The right and the left first floor coverings 8 project from the right and the left sideboards 6, respectively, to a luggage space of the luggage compartment. The second floor covering 2 is disposed inner than and adjacent to the right and the left first floor coverings 8 in the width direction of the vehicle. The second floor covering 2 has a dimension in the width direction of the vehicle slightly less than a distance between the right and the left first floor coverings 8. More specifically, the first board 10 and the second board 20 each having dimensions in the width direction of the vehicle slightly less than the distance between the right and the left first floor coverings 8.

The right first floor covering 8 illustrated in FIGS. 2 to 5 will be described. The left first floor covering 8 has a configuration similar to the configuration of the right first floor covering 8 and thus will not be described in detail. The right first floor covering 8 includes a flange 40 (a back surface support). The flange 40 protrudes from a side surface of the right first floor covering 8 away from the right sideboard 6 toward the inner side of the luggage compartment 5 and under the back surface of the second floor covering 2 to support the back surface of the second floor covering 2 from below. The flange 40 extends in the front-rear direction of the vehicle to support at least a section of the right edge of the first board 10 and a section of the right edge of the second board 20 when the second floor covering 2 is in the unfolded position.

The separator 4 is disposed between a back surface of a backrest of the seat 7 and the underfloor storage 3. The separator 4 includes a first portion 4A, a second portion 4B, a third portion 4C, a fourth portion 4D, and a fifth portion 4E. The first portion 4A is disposed at the front of the luggage compartment immediately behind the back surface of the backrest of the seat 7. The first portion 4A includes a plate surface (a top surface) which has a long dimension in the width direction of the vehicle about equal to the dimension of the second floor covering 2 in the width direction of the vehicle. The first portion 4A is disposed in a horizontal position such that the plate surface of the first portion 4A is substantially flush with the top surface of the right first floor covering 8. The second portion 4B has an L shape and extends downward from the rear edge of the first portion 4A. The rear edge of the first portion 4A linearly extends in the width direction of the vehicle. The third portion 4C extends from the rear edge of the second portion 4B toward the lower front of the vehicle to form a slope and then downward. The fourth portion 4D extends from the lower edge of the third portion 4C toward the rear of the vehicle. The fifth portion 4E extends downward from the rear edge of the fourth portion 4D. The fifth portion 4E is coupled with a front edge of a bottom of the underfloor storage 3 to define a front wall of the underfloor storage 3.

As illustrated in FIG. 1, the first board 10 includes the second end 11 (an opposite end) on an opposite side form the first end to which the hinge 30 is coupled. The second end 11 includes a linear edge that extends in the width direction of the vehicle. The second end 11 is disposed on the second portion 4B of the separator 4 when the second floor covering 2 is in the unfolded position such that the linear edge of the second end 11 is disposed along the rear edge of the first portion 4A of the separator 4. The second board 20 includes the second end 21 on an opposite side from the first end to which the hinge 30 is coupled and connected to the first end of the first board 10 via the hinge 30. The second board 20 includes a handle 31 at the middle of the second end 21. The second end 21 of the second board 20 has a curved edge (a round edge) which is curved outward toward the rear of the vehicle.

Next, shifting of the second floor covering 2 from the unfolded position to the folded position will be described. As illustrated in FIG. 1, when the second floor covering 2 is in the unfolded position, the first board 10 and the second board 20 are flat and the top surfaces of the first board 10 and the second board 20 are flush with each other (substantially in horizontal positions). The second floor covering 2 is supported by the flange 40 and the separator 4. In the unfolded position, the second floor covering 2 can hold luggage thereon.

The second board 20 of the second floor covering 2 in the unfolded position can be lifted by holding the handle 31 and pulling up the handle 31. When the second floor covering 2 is folded on the hinge 30 while the handle 31 is pulled up until the second board 20 is placed on the first board 10, the top surfaces of the first board 10 and the second board 20 closely contact each other. The back surface of the second board 20, which faces the underfloor storage 3 when the second floor covering 2 is in the unfolded position, faces upward. When the second board 20 is placed on the first board 10, the second end 21 of the second board 20 projects from the second end 11 of the first board 10 toward the front of the vehicle and contacts the separator 4.

Figure 3:
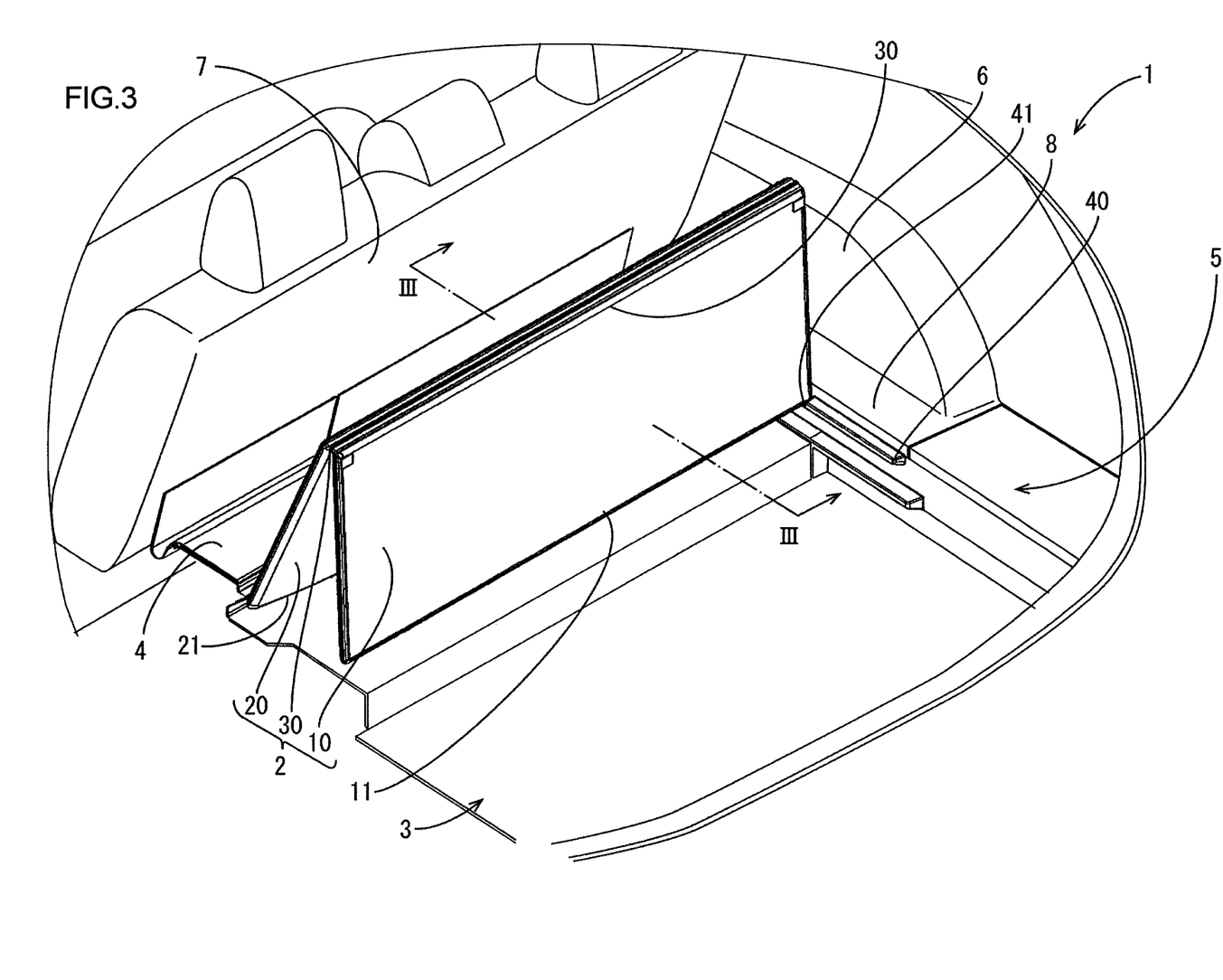
FIG. 3 is a perspective view illustrating the second floor covering in a folded position.
Figure 5:
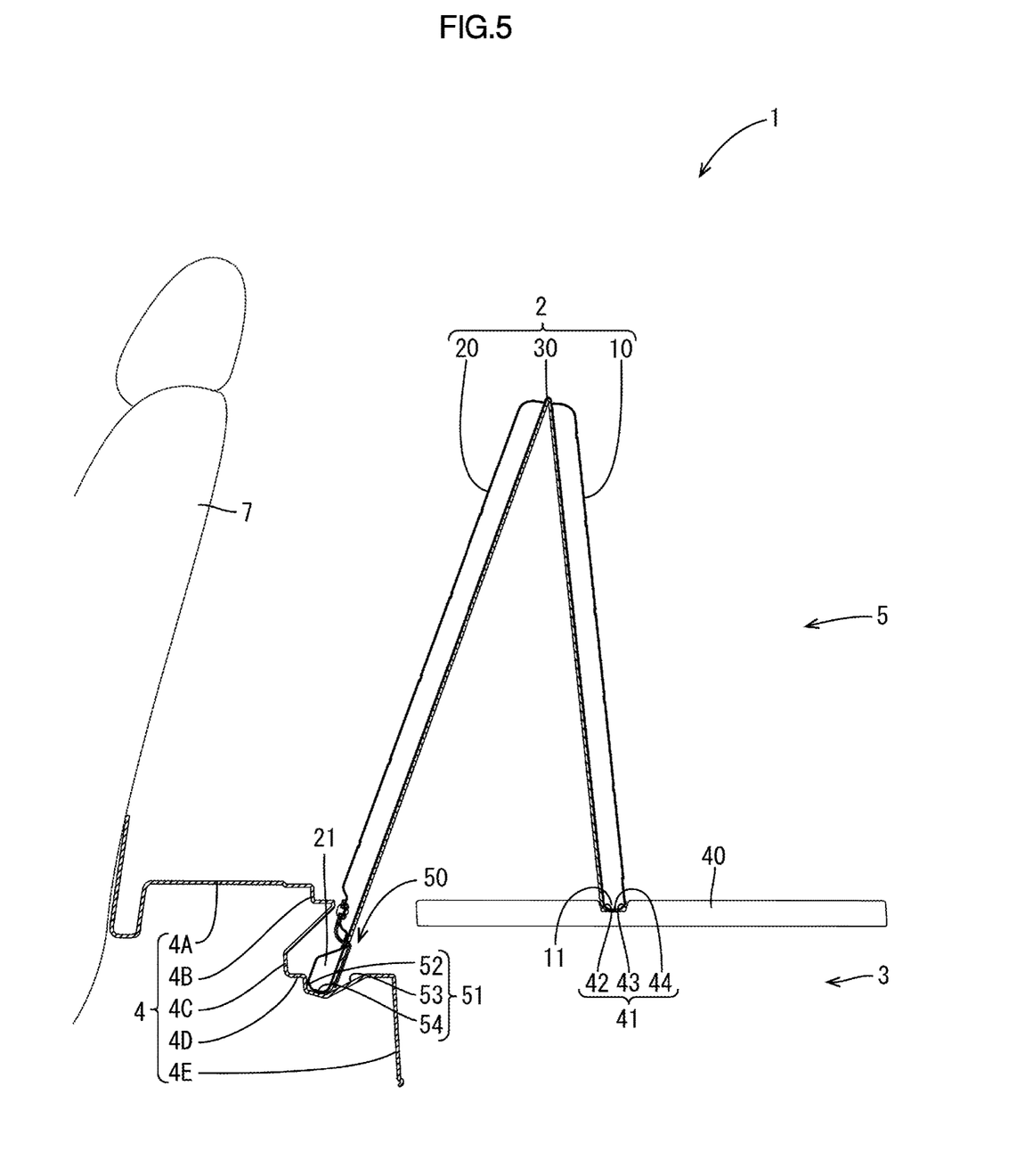
FIG. 5 is a magnified cross-sectional view illustrating the second floor covering in the folded position along line III-III in FIG. 3.

When the first end of the first board 10 on which the second board 20 is placed is lifted while the second end 21 of the second board 20 supported by the first portion 4A of the separator 4, the first board 10 separates from the second board 20 toward the rear of the vehicle and the second end 11 of the first board 10 slides toward the rear of the vehicle. As the second end 11 of the first board 10 slides toward the rear of the vehicle, the second floor covering 2 forms an inverted V shape as illustrated in FIG. 5. To stably hold the second floor covering 2 in this shape, that is, in the folded position, the flange 40 includes a first support surface 41 for supporting the second end 11 of the first board 10 from below and the separator 4 includes a second support surface 51 for supporting the second end 21 of the second board 20 from below. With the second end 11 supported by the first support surface 41 and the second end 21 supported by the second support surface 51, the second floor covering 2 folded on the hinge 30 is held in the folded position as illustrated in FIGS. 3 and 5. In the folded position, the first board 10 is sloped toward the rear of the vehicle and the second board 20 is sloped toward the front of the vehicle while the hinge 30 at the top of the slopes.

Figure 4:
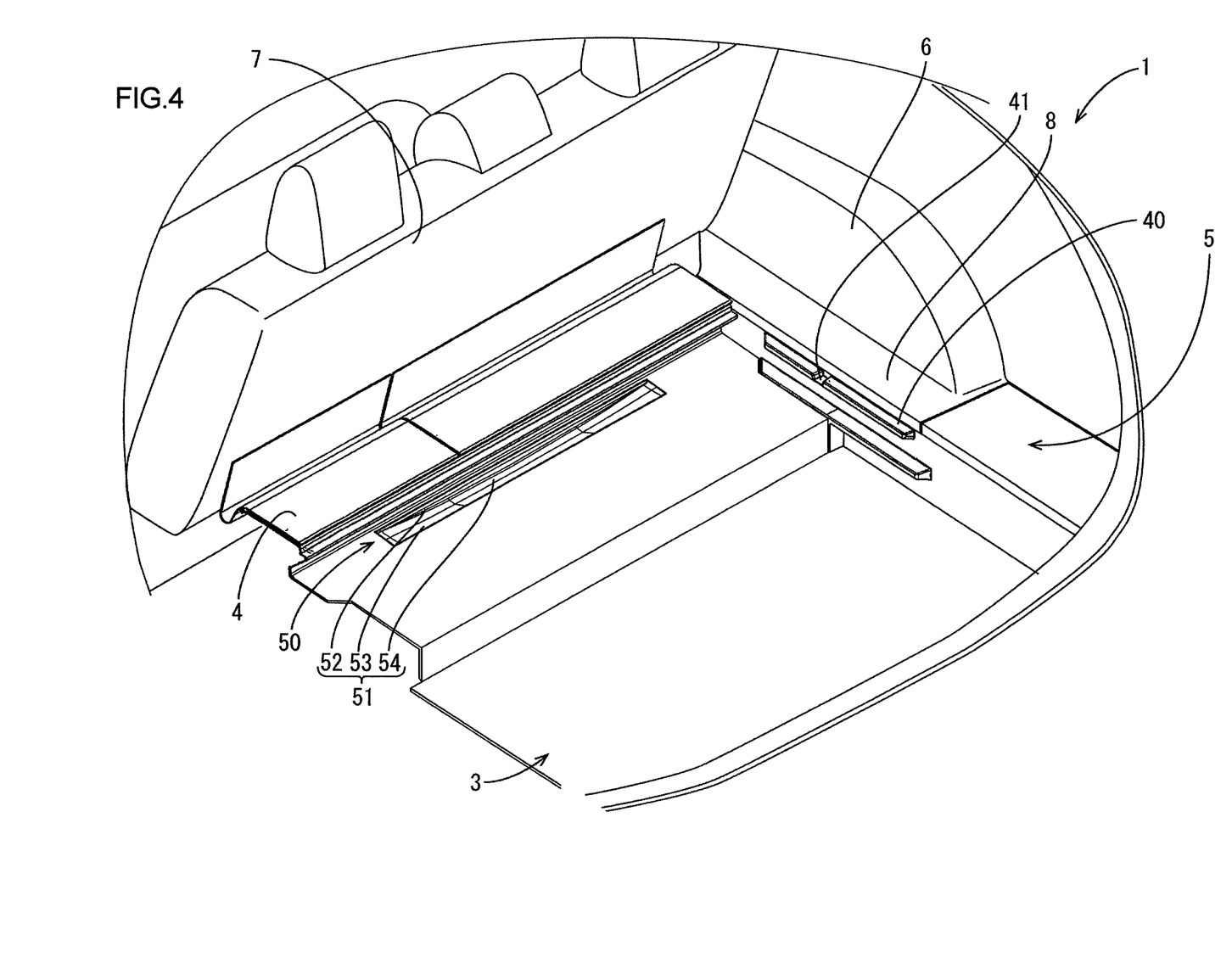
FIG. 4 is a perspective view illustrating of the luggage compartment without the second floor covering.

As illustrated in FIG. 4, the flange 40 includes a cutout that is defined by a front sloped surface 42, a rear sloped surface 43, and a bottom surface 44. The bottom surface 44 is located between a lower edge of the front sloped surface 42 and a lower edge of the rear sloped surface 43. The front sloped surface 42 is located closer to the front of the vehicle than the bottom surface 44 and sloped from a top surface of the flange 40 to a front edge of the bottom surface 44. The rear sloped surface 43 is located closer to the rear of the vehicle than the bottom surface 44 and sloped from the top surface of the flange 40 to a rear edge of the bottom surface 44. The cutout has a dimension between an upper edge of the front flopped surface and an upper edge of the rear sloped surface 43 in the front-rear direction of the vehicle greater than a dimension of the bottom surface 44 in the front-rear direction of the vehicle. The first support surface 41 includes the front sloped surface 42, the rear sloped surface 43, and the bottom surface 44 to hold the second end 11 of the first board 10 of the second floor covering 2 that is in the folded position. The second end 11 of the first board 10 contacts the first support surface 41.

The separator 4 includes a groove 50 in the fourth portion 4D. The groove 50 is defined by a front wall surface 52, a sloped surface 53, and a bottom surface 54. The bottom surface 54 is curved along the curved edge of the second end 21. The bottom surface 54 is located between a lower edge of the front wall surface and a lower edge of the sloped surface to connect the lower edge of the front wall surface to the lower edge of the sloped surface. The front wall surface 52 is located closer to the front of the vehicle than the bottom surface 54 to extend upward from a front edge of the bottom surface 54. The sloped surface 53 is located closer to the rear of the vehicle and sloped from the top surface of the fourth portion 4D of the separator 4 to a rear edge of the bottom surface 54. The second support surface 51 includes the front wall surface 52, the sloped surface 53, and the bottom surface 54. The second end 21 of the second board 20 contact the second support surface 51. The second support surface 51 is located lower and closer to the front of the vehicle than the first support surface 41. The second end 21 of the second board 20 is disposed in the groove 50 to contact at least the front wall surface 52 when the second floor covering 2 is in the folded position. The front wall surface 52 is located between the rear edge of the second portion 4B and the lower edge of the third portion 4C with respect to the front-rear direction of the vehicle.

According to the configuration described above, the second floor covering 2 is disposed above the first support surface 41 when the second floor covering 2 is in the unfolded position and the intermediate position. The second end 11 of the first board 10 is disposed on the second portion 4B located above the first support surface 41 when the second floor covering 2 is in the unfolded position and the intermediate position. In the intermediate position, the second board 20 is placed on the first board 10 in the intermediate position and thus the second end 21 of the second board 20 is located above the first support surface 41. To shift the position of the second floor covering 2 from the unfolded position or the intermediate position, the second end 11 of the first board 10 is moved down to the first support surface 41 and the second end 21 of the second board 20 is moved down to the second support surface 51. In the folded position, the second end 11 of the first board 10 is disposed on the first support surface 41 in the cutout and the second end 21 of the second board 20 is disposed on the second support surface 51 in the groove 50. Regardless of the positions, the second floor covering 2 is supported by other components of the floor structure 1 of the luggage compartment 5. To shift the position of the second floor covering 2 from the folded position to the unfolded position, the procedure described above is performed in reversed sequence. The first board 10 blocks a view of the second support surface 51. Because the second support surface 51 is less likely to be viewed, the appearance of the luggage compartment 5 is less likely to be degraded.

Effects will be described. The second support surface 51 is located below and closer to the front of the vehicle than the first support surface 41. Although a distance between the hinge 30 and the second end 11 of the first board 10 and a distance between the hinge 30 and the second end 21 of the second board 20 are different from each other, the second floor covering 2 is stably maintained in the folded position. According to the configuration, extra parts (e.g., a hook) are not required to stably maintain the second floor covering 2 in the folded position. The second support surface 51 is located closer to the front of the vehicle than the first support surface 41. In comparison to a configuration in which the second support surface 51 is located closer to the rear of the vehicle than the first support surface 41, the underfloor storage 3 under the floor of the luggage compartment 5 is easily accessible by setting the second floor covering 2 in the folded position. Furthermore, dead space in the underfloor storage 3 is reduced. The second support surface 51 is located below the first support surface 41. Therefore, the second floor covering 2 can be easily set in the folded position regardless of physical sizes of users. Open and close operation of the second floor covering 2 can be easily performed.

The second end 21 of the second board 20 includes the curved edge that is curved outward toward the rear of the vehicle when the second floor covering 2 is in the unfolded position. The groove 50 in which the second end 21 is disposed when the second floor covering 2 is in the folded position includes the bottom surface 54 that is curved along the curved edge of the second end 21 of the second board 20. The groove 50 includes the front wall surface 52 and the sloped surface 53. When the second floor covering 2 is in the folded position, the second end 21 of the second board 20 in the groove 50 contacts the front wall surface 52 that is perpendicular to the top surfaces of the right and the left first floor coverings 8. The front wall surface 52 restricts the second end 21 of the second board 20 from sliding toward the front of the vehicle.

The groove 50 includes the bottom surface 54 that is curved along the curved edge of the second end 21 of the second board 20. When the second floor covering 2 is in the folded position, the second end 21 of the second board 20 is fitted in the groove 50. The groove 50 restricts the second end 21 of the second board 20 from moving in the width direction of the vehicle. According to the configuration, the second floor covering 2 can be further stably maintained in the folded position. The second support surface 51 includes the sloped surface 53. Even if the second end 21 of the second board 20 is not perfectly positioned in the groove 50 when the second end 21 is inserted into the groove 50, the second end 21 gradually slides to a proper position in the groove 50.

The vehicle includes the flange 40 and a flange 40 included in the left first floor covering 8 that support the second floor covering 2 that is in the unfolded position from below. The first support surface 41 is included in the flange 40 of the right first floor covering 8 and a first support surface 41 is included in the flange 40 of the left first floor covering 8. The first support surfaces 41 are only slightly below the top surfaces of the flanges 40. Therefore, the second end 11 of the first board 10 easily slides into the cutouts of the flanges 40 to contact the first support surfaces 41. An excessive force is not required to lift the second floor covering 2 to set the second floor covering 2 in the folded position or lease the second floor covering 2 from the folded position. The positions of the second floor covering 2 can be smoothly changed therebetween.

The dimension of the opening in the top surface of each of the cutouts in the flanges 40 is greater than the dimension of the opening in the side surface of the cutout to hold the second end 11 of the first board 10 when the second floor covering 2 is in the folded position. The second end 11 of the first board 10 is fitted in the cutouts. Therefore, the second floor covering 2 is further stably maintained in the folded position.

A section of the third portion 4C of the separator 4 located above the groove 50 is sloped and thus a larger clearance is provided for the second end 21 of the second board 20 so that the second end 21 is more smoothly inserted into the groove 50 in comparison to a configuration in which the section of the third portion 4C is a vertical portion that is not sloped toward the lower front of the vehicle. Furthermore, the second floor covering 2 can be more stably maintained in the folded position in comparison to the configuration in which the section of the third portion 4C is the vertical portion because the second end 21 of the second board 20 can be disposed farther away from the second end 11 of the first board 10 in comparison to the configuration.

Second Embodiment

Figure 6:
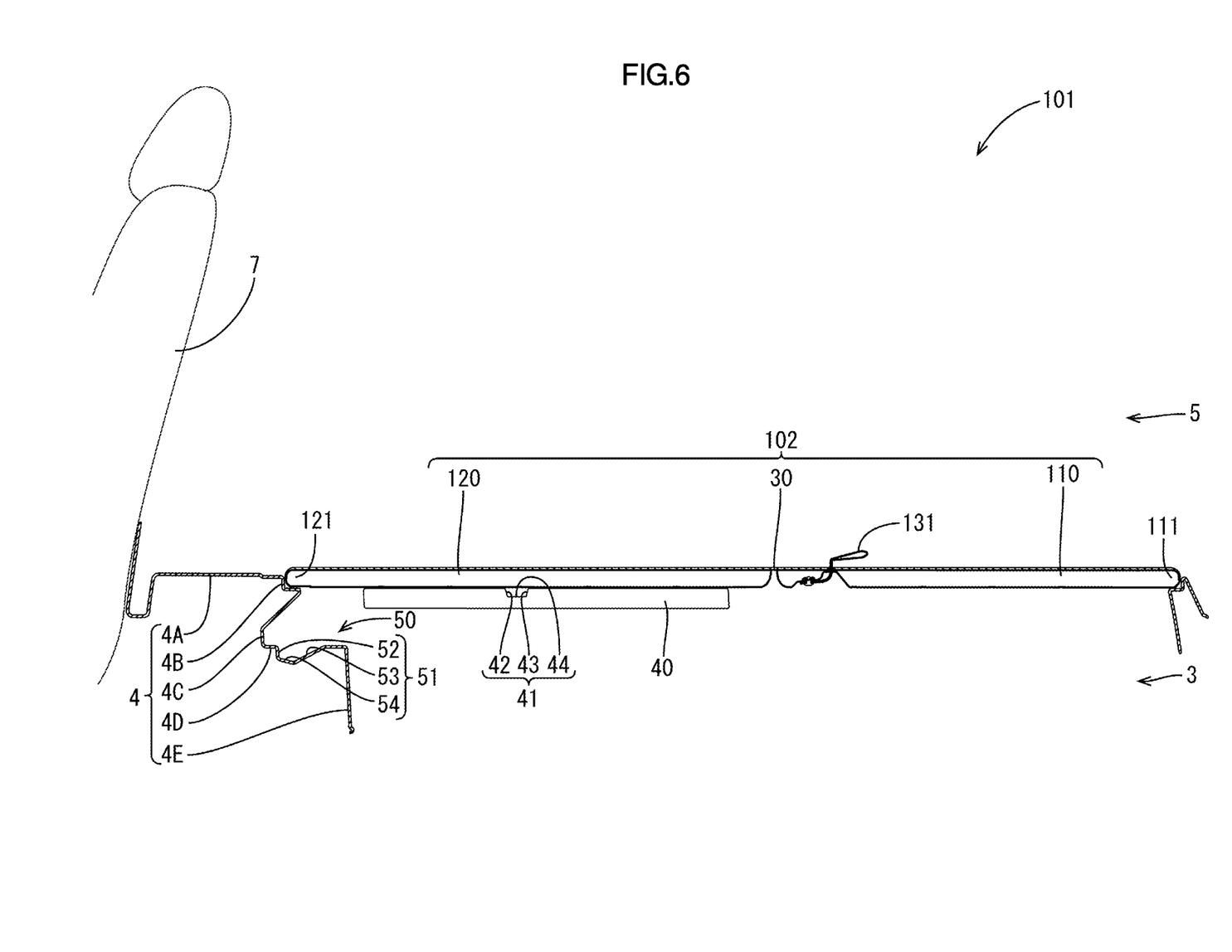
FIG. 6 is a magnified cross-sectional view illustrating a second floor covering in an unfolded position according to a second embodiment.

A second embodiment will be described with reference to FIG. 6. A floor structure 101 of the luggage compartment 5 will be described. Components the same as those in the first embodiment will be indicated by the reference symbols that indicate those components in the first embodiment. Configurations, functions, and effects of those components will not be described in detail.

The floor structure 101 includes a second floor covering 102, the separator 4, and the right and the left first floor coverings 8. The second floor covering 102 includes a first board 110, a second board 120, and the hinge 30 that is located between the first board 110 and the second board 120. The first board 110 includes a first end closer to the hinge 30 and a second end 111 farther from the hinge 30. The second board 120 includes a first end closer to the hinge 30 and a second end 121 farther from the hinge 30. The first end of the second board 120 is coupled with the first end of the first board 110 via the hinge 30. The second floor covering 102 further includes a handle 131 that is located at about the middle of the hinge 30.

The second floor covering 102 is disposed between the right and the left first floor coverings 8. The second floor covering 102 has a dimension in the width direction of the vehicle slightly less than a distance between the right and the left first floor coverings 8. More specifically, the first board 110 and the second board 120 each having dimensions in the width direction of the vehicle slightly less than the distance between the right and the left first floor coverings 8. The hinge 30 has a dimension in the width direction of the vehicle about equal to a dimension of the first board 110 or the second board 120 in the width direction of the vehicle.

When the second floor covering 102 is in an unfolded position in which the second floor covering 102 is not folded on the hinge 30, the first board 110 and the second board 120 are placed flat such that a top surface of the first board and a top surface of the second board 120 are flush with each other. The second end 121 of the second board 120 is disposed on the second portion 4B of the separator 4. To shift the position of the second floor covering 102 from the unfolded position to a folded position in which the second floor covering 102 is folded on the hinge 30, the handle 131 is pulled to lift the second floor covering 102 until the second end 111 of the first board 110 is inserted in the cutouts in the flanges 40 and the second end 121 of the second board 120 is inserted in the groove 50 of the separator 4. In the folded position, the second end 111 of the first board 110 is supported by the first support surface 41 from below and the second end 121 of the second board 120 is supported by the second support surface 51 from below. In the folded position, the first board 110 is sloped toward the rear of the vehicle and the second board 120 is sloped toward the front of the vehicle while the hinge 30 at the top of the slopes. According to the configuration, the position of the second floor covering 102 can be smoothly shifted from the unfolded position to the folded position.

Other Embodiments

The technology described herein is not limited to the embodiment described in the above description and the drawings. The technology described herein may include the following embodiments.

(1) The dimensions of the first boards and the second boards in the front-rear direction of the vehicle may be altered as long as the second floor coverings are stably maintained in the folded positions.

(2) A second floor covering including four boards and three hinges for shifting a position of the second floor covering between a folded position and an unfolded position may be included in the technical scope of the technology described herein.

(3) The flanges of the first floor coverings may be omitted. In this case, the vehicle may include flanges that project from lower edges of the right and the left sideboards to define portions of the luggage compartment floor and the support surfaces may be provided in the flanges.

(4) The position, the shape, and the material of each first support surface may be altered as appropriate. The first support surface may be provided separately from the flange. Rubbers may be attached to the first support surfaces so that the second end of the first board does not slide due to friction of the rubbers and thus the second floor covering is maintained in the folded position.

(5) The position and the shape of the groove in each embodiment may be altered where appropriate. The groove may be formed in any shape as long as the groove properly holds the second end of the second board to stable maintain the second floor covering in the folded position. Alternatively, the separator may include a protrusion to hold the second end of the second board to stably maintain the second floor covering in the folded position.

(6) The position or the number of the handle in each embodiment may be altered where appropriate. Another hinge may be provided at a position closer to the hinge for supporting the shifting of the second floor covering from the intermediate position to the folded position.

(7) The second floor covering in each embodiment may be folded in different manners. For example, the second floor covering in the first embodiment may be shifted from the unfolded position to the folded position without the intermediate position in which the second board is placed on the first board. The first board and the second board may be separated from each other during the shifting the position of the second floor covering from the unfolded position to the folded position.

(8) The technology described herein may be applied to any vehicles and craft including second floor coverings.

The invention claimed is:

1. A floor structure of a luggage compartment of a vehicle, the floor structure comprising:
   at least one first floor covering projecting from a sideboard of the luggage compartment to a luggage space of the luggage compartment and including at least one first support surface;
   a second floor covering disposed inward from and adjacent to the at least one first floor covering in a width direction of the vehicle and above the at least one first support surface, the second floor covering comprising:
      a first board including a first end and a second end separated from the first end in a front-rear direction of the vehicle;
      a second board including a first end adjacent to the first end of the first board and a second end separated from the first end of the second board in the front-rear direction of the vehicle, the second board having a dimension in the front-rear direction of the vehicle greater than a dimension of the first board in the front-rear direction of the vehicle; and
      a hinge connecting the first end of the second board to the first end of the first board to shift a position of the second floor covering between an unfolded position in which the second floor covering is flat and a folded position in which the second floor covering is folded about the hinge; and
   a separator separating a underfloor storage located under the second floor covering from a passenger compartment of the vehicle and supporting an end of the second floor covering closer to the passenger compartment, the separator comprising a second support surface located below and closer to a front of the vehicle than the at least one first support surface to support the second end of the second board of the second floor covering in the folded position from below and to restrict the second end of the second board of the second floor covering in the folded position from sliding toward the front of the vehicle.

2. The floor structure according to claim 1, wherein
the second end of the second board includes a curved edge that is curved outward,
the separator includes a groove defined by a front wall surface, a sloped surface, and a bottom surface
the bottom surface is curved along the curved edge of the second end of the second board and located between a lower edge of the front wall surface and a lower edge of the sloped surface to connect the lower edge of the front wall surface to the lower edge of the sloped surface,
the front wall surface is located closer to the front of the vehicle than the bottom surface to extend upward from a front edge of the bottom surface,
the sloped surface is located closer to a rear of the vehicle than the bottom surface and sloped from a top surface of the separator to a rear edge of the bottom surface, and
the second support surface includes the front wall surface, the sloped surface, and the bottom surface.

3. The floor structure according to claim 1, wherein
the at least one first floor covering includes a back surface support protruding from a side surface of the at least one first floor covering away from the sideboard for supporting a back surface of the second floor covering that is in the unfolded position from below, and
the at least one first support surface is included in the back surface support.

4. The floor structure according to claim 3, wherein
the back surface support includes a cutout defined by a front sloped surface, a rear sloped surface, and a bottom surface,
the bottom surface is located between a lower edge of the front sloped surface and a lower edge of the rear sloped surface to connect the lower edge of the front sloped surface to the lower edge of the rear sloped surface,
the front sloped surface is located closer to the front of the vehicle than the bottom surface and sloped from a top surface of the back surface support to a front edge of the bottom surface,
the rear sloped surface is located closer to a rear of the vehicle than the bottom surface and sloped from the top surface of the back surface support to a rear edge of the bottom surface,
the cutout has a dimension between an upper edge of the front sloped surface and an upper edge of the rear sloped surface in the front-rear direction of the vehicle greater than a dimension of the bottom surface in the front-rear direction of the vehicle, and
the at least one first support surface includes the front sloped surface, the rear sloped surface, and the bottom surface to hold the second end of the first board of the second floor covering that is in the folded position.

5. The floor structure according to claim 1, wherein
the separator comprises:
a first portion disposed at a front of the luggage compartment and including a top surface disposed substantially flush with a top surface of the at least one first floor covering;
a second portion having an L shape and extending downward from a rear edge of the first portion, the second portion being located above the at least one support surface;
a third portion extending from a rear edge of the second portion toward a lower front of the vehicle to form a slope;
a fourth portion extending from a lower edge of the third portion toward a rear of the vehicle; and
a fifth portion extending downward from a rear edge of the fourth portion and being coupled with a front edge of a bottom of the underfloor storage to define a front wall of the underfloor storage,
the first end of the first board of the second floor covering that is in the unfolded position is disposed on the second portion of the separator, and the second support surface is included in the fourth portion of the separator.

6. The floor structure according to claim 2, wherein the separator comprises:

a first portion disposed at a front of the luggage compartment and including a top surface disposed substantially flush with a top surface of the at least one first floor covering;

a second portion extending from a rear edge of the first portion in an L shape and extending downward from a rear edge of the first portion, the second portion being located above the at least one first support surface;

a third portion extending from a rear edge of the second portion toward a lower front of the vehicle to form a slope;

a fourth portion extending from a lower edge of the third portion toward the rear of the vehicle; and a fifth portion extending downward from a rear edge of the fourth portion and being coupled with a front edge of a bottom of the underfloor storage to define a front wall of the underfloor storage, the first end of the first board of the second floor covering that is in the unfolded position is disposed on the second portion of the separator, and the groove is included in the fourth portion of the separator.

7. The floor structure according to claim 6, wherein the second end of the second board of the second floor covering that is in the folded position is disposed in the groove to contact at least the front wall surface and the bottom surface, and the front wall surface is located between the rear edge of the second portion and the lower edge of the third portion with respect to the front-rear direction of the vehicle.

8. The floor structure according to claim 1, wherein the at least one first floor covering includes first floor coverings projecting from sideboards of the luggage compartment to the luggage space of the luggage compartment, the first floor coverings include back surface supports protruding from side surfaces of the first floor coverings away from the sideboards for supporting a back surface of the second floor covering that is in the unfolded position from below, and the at least one first support surface includes first support surfaces, and each of the back surface supports includes one of the first support surfaces.

9. The floor structure according to claim 5, wherein the rear edge of the first portion of the separator linearly extends in the width direction of the vehicle, the second end of the first board includes a linear edge extending in the width direction of the vehicle, and the linear edge of the second end of the first board of the second floor covering that is in the unfolded position is disposed along the rear edge of the first portion of the separator.

* * * * *